(12) United States Patent
Sunell et al.

(10) Patent No.: US 8,798,053 B2
(45) Date of Patent: Aug. 5, 2014

(54) HEADER COMPRESSION IN WIRELESS LINKS

(75) Inventors: Kai-Erik Sunell, Bromma (SE); Mats Buchmayer, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 841 days.

(21) Appl. No.: 12/665,215

(22) PCT Filed: Mar. 27, 2008

(86) PCT No.: PCT/SE2008/050344
§ 371 (c)(1),
(2), (4) Date: Dec. 17, 2009

(87) PCT Pub. No.: WO2008/156411
PCT Pub. Date: Dec. 24, 2008

(65) Prior Publication Data
US 2010/0195592 A1    Aug. 5, 2010

(30) Foreign Application Priority Data
Jun. 18, 2007 (SE) .................................. 0701473-1

(51) Int. Cl.
*H04L 12/28* (2006.01)
*H04L 29/06* (2006.01)
*H04J 3/18* (2006.01)
*H04W 28/06* (2009.01)

(52) U.S. Cl.
CPC ............. *H04L 69/04* (2013.01); *H04W 28/06* (2013.01)
USPC .......................................... 370/390; 370/477

(58) Field of Classification Search
None
See application file for complete search history.

(56) References Cited

U.S. PATENT DOCUMENTS

| 7,010,727 | B1 | 3/2006 | Stucker |
| 2002/0094027 | A1* | 7/2002 | Sato et al. ................ 375/240.13 |
| 2002/0142757 | A1* | 10/2002 | Leung et al. .................. 455/412 |
| 2003/0054807 | A1* | 3/2003 | Hsu et al. ...................... 455/414 |
| 2004/0180675 | A1* | 9/2004 | Choi et al. ..................... 455/458 |
| 2005/0074024 | A1* | 4/2005 | Kim et al. ...................... 370/432 |
| 2005/0075107 | A1* | 4/2005 | Wang et al. ................ 455/435.1 |
| 2005/0090273 | A1* | 4/2005 | Jin et al. ........................ 455/502 |
| 2005/0094670 | A1* | 5/2005 | Kim ............................... 370/477 |
| 2007/0070995 | A1* | 3/2007 | Pelletier et al. ............... 370/389 |
| 2007/0165635 | A1* | 7/2007 | Zhang et al. .................. 370/390 |

FOREIGN PATENT DOCUMENTS

| EP | 1507364 A2 | 2/2005 |
| WO | 2004/028042 A1 | 4/2004 |

OTHER PUBLICATIONS

Bormann et al.; "RObust Header Compression (ROHC): Framework and Four Profiles: RTP, UDP, ESP and uncompressed"; Internet Official Protocol Standards (STD 1), Request for Comments: 3095, Standards Track; Jul. 2001; pp. 1-169; The Internet Society.

* cited by examiner

*Primary Examiner* — Eunsook Choi
(74) *Attorney, Agent, or Firm* — Coats & Bennett, P.L.L.C.

(57) ABSTRACT

In compression of packet data headers the compressor side (100) in a point-to-multipoint connection transmits (301) a message announcing a particular service. The entities (200) receiving the announcement message are adapted to respond to the message and based on the response message(s) (305) the compressor can adapt the compression scheme used. In particular the compressor may compress (315) or not compress (311) the header of the packet data header.

14 Claims, 3 Drawing Sheets

HEADER COMPRESSION IN WIRELESS LINKS

TECHNICAL FIELD

The present invention is related to the field of header compression in data packets in a wireless communication network. In particular the present invention relates to a method and device for use in point to multi point services such as Multimedia Broadcast Multicast Services (MBMS).

BACKGROUND

An important problem for packet transfer over radio interfaces is the overhead caused by the packet headers. If a large number of relatively small packets are transferred, such as in interactive voice conversations, the overhead accounts for a significant part of the available bandwidth. Consequently, header compression protocols are usually supported in most radio interface standards.

One header compression technique is specified in the Internet Engineering Task Force (IETF) Request For Comments (RFC) 3095 where the compression scheme is denoted as Robust Header Compression (RoHC), see "RObust Header Compression (RoHC): Framework and four profiles: RTP, UDP, ESP and uncompressed", IETF RFC3095. This compression scheme is designed to work well when used over links with high error rates and long-round trip times, as opposed to other existing compression schemes.

In RoHC the compressor and de-compressor operates using multiple states. The operation always starts in the lowest compression state and transitions are made gradually towards higher compression states. The mode of operation controls the logic of state transitions and what actions to perform in each state.

Generally, there are two different types of modes of operation; unidirectional and bidirectional. In unidirectional mode, packets are sent from compressor to de-compressor and thereby transitions between compressor states are performed without any knowledge about the de-compressor state, e.g. periodically. In turn bidirectional modes have feedback mechanisms for error recovery requests and acknowledgements of context updates from de-compressor back to compressor.

Bi-directional modes typically do not have as frequent transitions to low compression states as unidirectional mode and therefore they have (in some sense) better compression efficiency.

In certain cases however, such as, for example, Multimedia Broadcast Multicast Services (MBMS) of which mobile TV is one example, a fundamental difference compared to conventional mobile communication services is that MBMS is characterized by point-to-multipoint connections instead of point-to-point connections.

One consequence of point-to-multipoint communication is that there are multiple de-compressor machines (typically one in each terminal) and typically one compressor machine per service at the network side. Similarly, feedback channels between compressor(s) and de-compressors are undesirable (or infeasible) and therefore unidirectional mode of operation is the preferred choice.

In point-to multipoint connections a problem arises with conventional technology, since the number of involved de-compressor machines is constantly changing because some users join and leave the MBMS service every now and then. Hence, in order to create contexts for all de-compressors, the compressor must perform a transition to the lowest compression state whenever a new user has joined the service. In general, the arrival of a new user is unpredictable and therefore the compressor must perform these transitions in a very conservative manner. In reality the compressor may need to always assume worst-case situations with a large user population and short inter-arrival times. Although this type of design creates the necessary context for all de-compressors, the overall header compression efficiency is impaired due to frequent transitions to the lowest compression state.

Hence there exists a need for a more efficient transmission of data in point-to-multipoint connections.

SUMMARY

It is an object of the present invention to provide a more efficient transmission of data in point-to multipoint connections.

This object and others are obtained by the method and device as set out in the appended claims.

Thus, by providing a compression scheme for a point-to multi point connection where the compressor is provided with information relating to the arrival and/or status of the de-compressors receiving a compressed data stream without a dedicated feedback channel from the de-compressor(s). This is obtained by providing a mechanism at the compressor side in a point-to-multipoint connection that transmits a message related to a particular service. The entities receiving the announcement message are adapted to respond to the message and based on the response message(s) the compressor can adapt the compression scheme used. In particular the compressor may compress or not compress the header of the packet data header.

In accordance with one embodiment of the present invention a method for header compression in a data packet is provided. First an announcement message is transmitted announcing a data packet service; and a polling message for counting the number of interested receiving entities. After receiving an interest message indicating the number of entities interested in the announced data packet service; and after receiving information indicative of at least one entity having received the polling message for the first time or having experienced a data packet header decompression error; data packets comprising uncompressed data packet headers related to the announced data packet service are transmitted. After receiving a status message indicative of the state of the entity having received the announcement message data packets comprising compressed data packet headers related to the announced data packet service are transmitted.

The invention also extends to a computer program product and to a compression device for compressing data in accordance with the above method. The compression device adapted to compress data can, for example, be a base station transceiver, a gateway, a gateway which is part of a base station transceiver, an access point or some other infrastructure device performing equivalent functions.

The invention further extends to a mobile terminal for communication in a wireless communication network where the mobile terminal comprises a receiver for receiving an announcement message announcing a data packet service and for receiving data packets comprising uncompressed and compressed data packet headers related to the announced data packet service. The mobile terminal also comprises a transmitter for transmitting a state of the mobile terminal, and is adapted to transmit an interest message indicating that the mobile terminal is interested in the announced data packet service and also adapted to transmit an information message indicating that the mobile terminal has received the first information message for the first time or having received a data packet header in error.

In this fashion the transmitter of the compressed data packet headers will not be forced to unnecessarily often send uncompressed packet headers and therefore the overall compression efficiency will be increased. This in turn will lead to a more efficient compression of data over a point to multipoint connection leading to a higher quality of received data for each receiver in the point-to-multipoint connection.

In accordance with one embodiment a method for header compression in a data packet comprising the steps: a) transmitting an announcement message announcing a data packet service; and a polling message for counting the number of interested receiving entities b) receiving an interest message indicative of a number of entities interested in the announced data packet service; c) receiving an information message indicative of at least one entity having received the polling message for the first time or having experienced a data packet header decompression error; d) transmitting data packets comprising uncompressed data packet headers related to the announced data packet service; e) receiving a status message indicative of the state of the entity having received the announcement message; f) transmitting data packets comprising compressed data packet headers related to the announced data packet service is provided.

In accordance with one embodiment, the announced data packet service comprises a multicast data packet service.

In accordance with one embodiment, the announced data packet service 20 comprises a broadcast data packet service.

In accordance with one embodiment, the status message indicative of the state of the entity having received the first information message comprises a de-compressor context.

In accordance with one embodiment, the at least one entity comprises a mobile terminal.

In accordance with one embodiment, a computer program for header compression in a data packet comprising instruction 30 sets for: a) transmitting an announcement message announcing a data packet service and a polling message for counting the number of interested receivers b) receiving an interest message indicative of a number of entities interested in the announced data packet service; c) receiving an information message indicative of the at least one entity having received the polling message for the first time or having received a data packet header in error; d) transmitting data packets comprising uncompressed data packet headers related to the announced data packet service; e) receiving status message indicative of the state of the entity having received the first information message; f) transmitting data packets comprising compressed data packet headers related to the announced data packet service is provided.

In accordance with one embodiment, a device for communication in a wireless communication network, the device comprising a transmitter for transmitting an announcement message announcing a data packet service and for transmitting data packets comprising uncompressed and compressed data packet headers related to the announced data packet service, a receiver for receiving a status message indicative of the state an entity having received the first information message, characterized by that the receiver being further adapted for receiving at least one interest message indicative of at least one entity being interested in the announced data packet service and by a processing unit for registering the number of entities interested in the announced data service, the receiver being further adapted for receiving an information message indicative of at least one entity having received the announcement message for the first time or having received a data packet header in error is provided.

In accordance with one embodiment, the processing unit is further adapted for compressing data packet headers related to the service announced.

In accordance with one embodiment, the device is a base station transceiver, an access point or some other equivalent entity.

In accordance with one embodiment, a mobile terminal for communication in a wireless communication network comprising a receiver for receiving an announcement message announcing a data packet service and for receiving data packets comprising uncompressed and compressed data packet headers related to the announced data packet service, the mobile terminal further comprising a transmitter for transmitting a state of the mobile terminal, wherein the transmitter is further adapted for transmitting an interest message indicative of the mobile terminal being interested in the announced data packet service and for transmitting an information message indicative of the mobile terminal having received the first information message for the first time or having received a data packet header in error is provided.

In accordance with one embodiment, the mobile terminal further comprising a processing unit for decompressing data packets related to the data packet service announced.

BRIEF DESCRIPTION OF THE DRAWINGS

The present invention will now be described in more detail by means of non-limiting examples and with reference to the accompanying drawings, in which.

DETAILED DESCRIPTION

At the outset, it should be remarked that the present description describes different embodiments of the present invention which are for illustrative purpose only.

Figure 1:
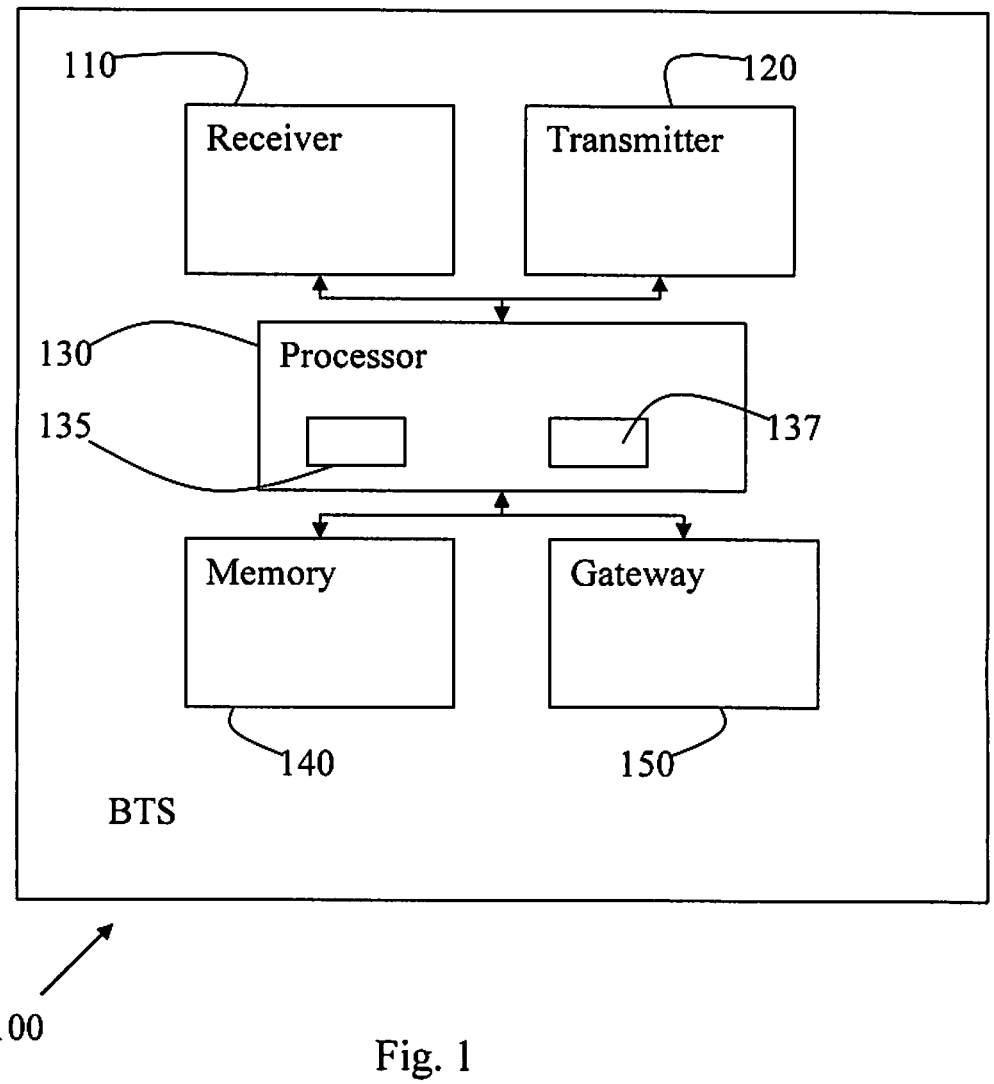
FIG. 1 illustrates a compression device according to one embodiment of the present invention.

In FIG. 1 a base transceiver station BTS 100 comprising a receiver 110 and transmitter 120 in communication with a processing unit 130 is shown. Also, the base transceiver station 100 may further comprise a memory 140 and, optionally, a gateway 150.

Figure 2:
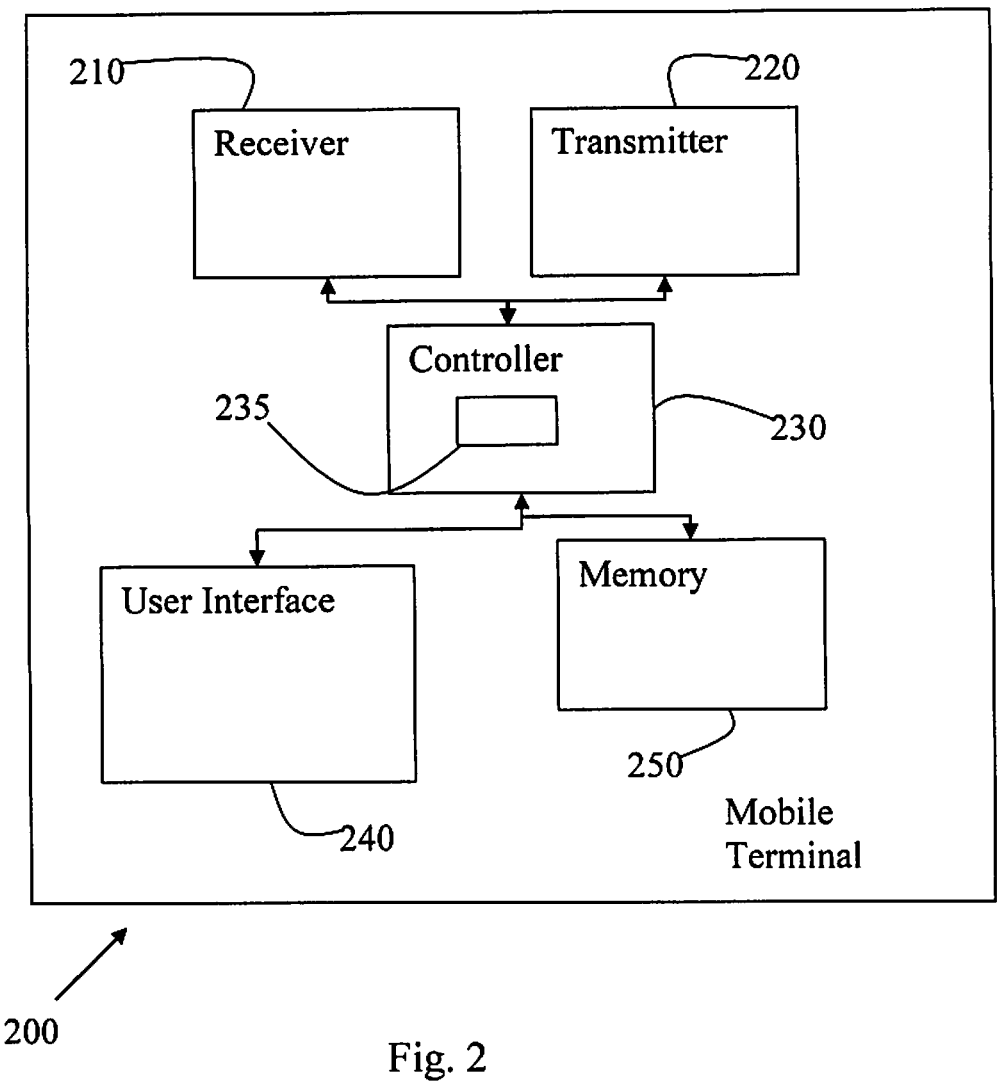
FIG. 2 illustrates a mobile terminal according to one embodiment of the present invention

While the functions of the receiver 110 and transmitter 120 are known of to the person having ordinary skills in the art, the processing unit 130 uses them to receive and send control signals and data from and to a mobile terminal, such as the mobile terminal illustrated in FIG. 2. The processing unit 130 comprises a compressor 135 for compressing data packet headers and possibly also a de-compressor 137 for decompressing compressed data received via the receiver 110. The de-compressor 137 is however not used in the described embodiments of the invention.

In accordance with one embodiment one compressor 135 per service is present in the processing unit 130 of the base transceiver station 100 and that also one de-compressor per service is present in each receiving mobile terminal.

Here, the term mobile terminal is to be interpreted as any mobile entity adapted for communication in a wireless communication network.

The base transceiver station 100 may also comprise a gateway 150 in communication with the processing unit 130, where instead of the processing unit 130, the gateway 150 may itself perform the header compression. The gateway 150 may be part of the base transceiver station or be located outside of it in some other part of the network. In the case the gateway is located outside of a base transceiver station, the compressed packets may be transmitted by the gateway to the mobile terminal or mobile terminals by one or several base transceiver stations, such as the base transceiver station 100 over the radio interface, i.e. from the network side to the terminal side.

Other examples of transceivers besides the Base Transceiver Station may be a Node B, an Access Point AP or some other network entity adapted for transmission of data packets. The transceivers are able to establish two-way communication links with mobile terminals and thereby some control information can be exchanged between the network side and the terminal side. However, no dedicated feedback channels are available from the de-compressors back to the compressor, such as the one located in the gateway or in the processing unit 130.

Also, the base transceiver station 100 may comprise a memory 140 for storing at least the number of mobile terminals using a service provided by the network via the base transceiver station 100.

FIG. 2 illustrates a mobile terminal 200 according to one embodiment of the present invention. The mobile terminal 200 can advantageously be used for communication with a base transceiver station, such as the base transceiver station 100 from FIG. 1 or any other entity comprising a compressor 135 adapted to compress data for a point-to-multipoint connection.

In addition to other features well known to the person having ordinary skill in the art, the mobile terminal 200 according to the present invention comprises a receiver 210 and a transmitter 220, a processing unit 230 in communication with the receiver 210 and transmitter 220, a user interface 240 and a memory 250 also in communication with the processing unit 230.

Via the receiver 210 and transmitter 220 the mobile terminal is able, among other functions, to receive and send control signals and data packets from and to a network entity, such as a base transceiver station.

The processing unit 230 can in accordance with one embodiment comprise a de-compressor 235 for decompressing data packet headers received via the receiver 210 and to transmit a notification message to for example a base transceiver station or a gateway about the state of the de-compressor 235 or a message indicating an interest in receiving a service provided in a wireless network and announced by the network side, for example via a gateway or a base transceiver station.

Figure 3:
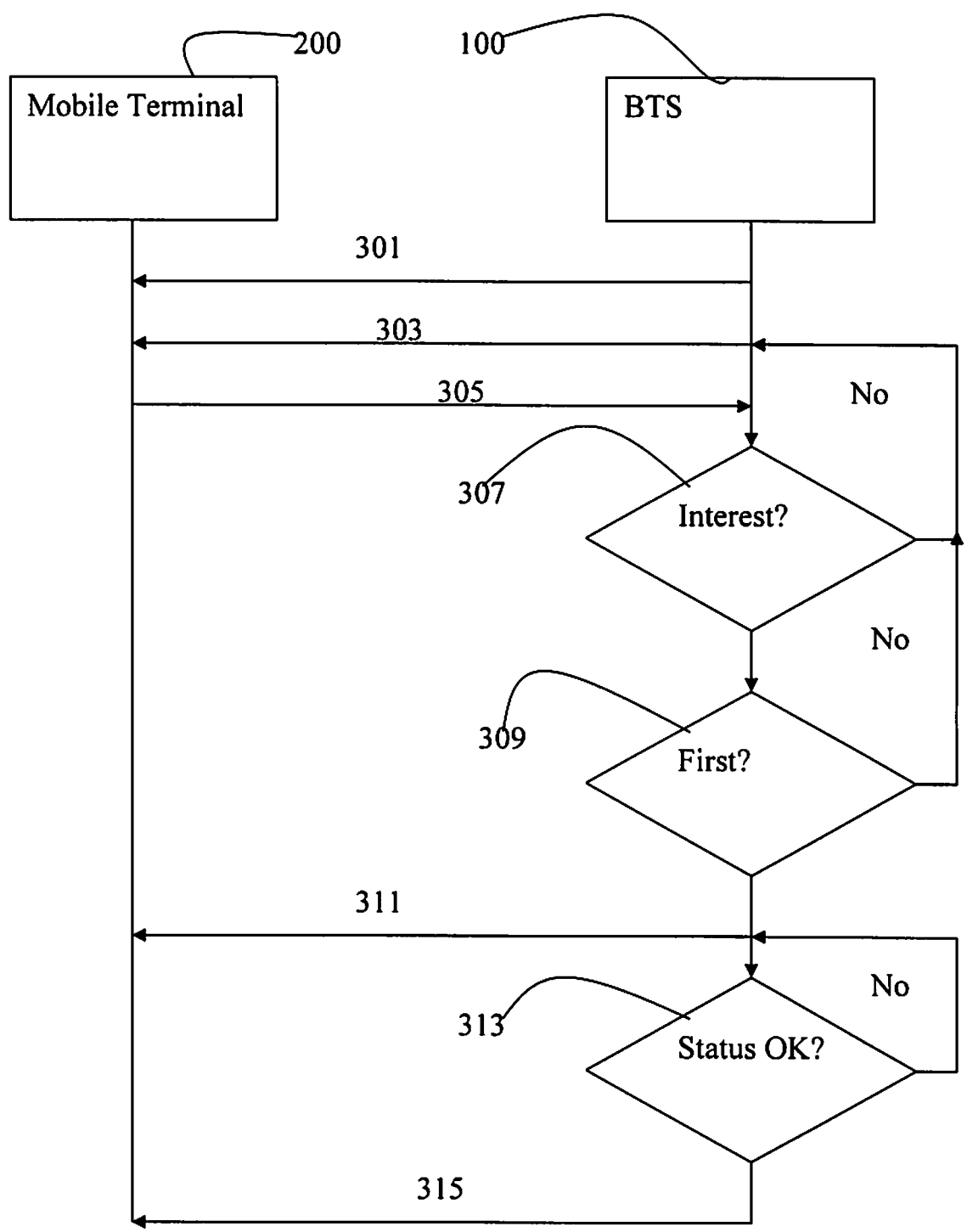
FIG. 3 illustrates steps performed when compressing data in accordance with one embodiment of the present invention.

In FIG. 3 one embodiment of a procedure used when providing a service including transmission of compressed data in a point-to multipoint connection according to the present invention is shown.

First in a message 301 the network side, such as a gateway or a base transceiver station 100 announces a point-to-multipoint service, such as a MBMS service. The actual data packet transmission may or may not have started yet at this time. In principle, the network side can be adapted to announce the service without actual transmission until at least one terminal has shown interest on the service. Next in a step 303 a polling message is transmitted where the terminals are asked to reply if they are interested in the announced services and they need to create or repair the de-compressor context. The message 303 may be transmitted as a separate message but may also be a part in implied by the message 301.

In response to the message 301 and or 303 a mobile terminal 200 can reply with an interest message 305 to the announced service.

Next, in a step 307, the network side, checks if the message 305 indicates interest in the announced service indicated in message 301. If no message indicating interest is received or if the message shows no interest message the network side continues to send messages 301 and 303. The messages 301 and 303 can for example be transmitted at certain pre-defined time intervals or when there is no other data to transmit or at other suitable times.

However, if a mobile terminal 200 has indicated interest in the announced service in the message 305, it is checked in a step 309 if the mobile terminal is being polled for the first time, i.e. the terminal has recently joined the service and needs to create de-compressor context or if it has a damaged de-compressor context.

In case the mobile terminal is not being polled for the first time or it does not have a damaged de-compressor context, the network side continues to send messages 301 and 303. The two checks performed at step 307 and 309 may be performed intermittently or at regular time intervals. The network side may perform other operations during the remaining time, such as receiving and transmitting data packets and control signals.

However, if the message 305 received form the mobile terminal 200 indicates that the messages 301 and or 303 has been received for the first time or if the message 305 indicates a damaged de-compressor context. In response to receiving a the message 305 indicating that the de-compressor is out of context, for example because the mobile terminal 200 is indicating interest in the service for the first time or the mobile terminal is out of context for some other reason such as by receiving an erroneous data stream, the network side transmits uncompressed headers in a stream 311. The data stream 311 transmits uncompressed headers to the mobile terminal in question in order to repair the context or to provide the de-compressor in the mobile station with enough information enable it decompress compressed packet data headers.

Next in a step 313, the current state of the de-compressor(s) in the one or more mobile terminals 200 is checked. If the state of the de-compressor(s) indicates that the mobile terminal receiving the service are ready to receive compressed data packet headers, compressed data packet headers related to the announced service announced are transmitted in a data stream 315.

In other cases if one or many mobile terminals are not ready to receive compressed headers, the network side continues to send uncompressed data packet headers and checks regularly whether the one or more mobile terminals are able to receive compressed data packet headers in a data stream 311.

The procedure described above in conjunction with FIG. 3 can be implemented by a computer program stored on a digital storage medium. The computer program can be loaded into a computer which can be adapted to execute the program to make a suitable entity on the network side function in accordance with the described procedure. For example the computer program may be executed by a computer program stored in a central entity, such as a gateway. Also, the central entity may be part of a transmitting entity, such as a Base Transceiver Station, Node B an access point or some other equivalent entity.

The compression procedure of the present invention may take the following form:

If (((the terminal is interested in the announced service AND it is being polled for the first time) OR (the terminal is interested in the announced service AND it has a damaged de-compressor context)) then reply with an information message, else do nothing.

The individual transmitting entities, such as base transceiver stations then count the number of these feedback messages and propagate the counted values to the central entity, such as the gateway, where the compressor state is changed accordingly if needed.

Using the method, device and computer program as described herein enables a transmitter of compressed data packet headers to not unnecessarily often send uncompressed packet headers and therefore the overall compression efficiency will be increased. This in turn will lead to a more efficient compression of data over a point to multipoint connection leading to a higher quality of received data for each receiver in the point-to-multipoint connection.

The invention claimed is:

1. A method for header compression in a data packet in a point-to-multi point (PTMP) connection, said method comprising the steps of:
   transmitting an announcement message announcing a PTMP data packet service;
   receiving one or more interest messages indicative of a number of entities interested in the announced PTMP data packet service and the state of de-compressors of the interested entities, as a response to the transmitted announcement message;
   responsive to any of the one or more interest messages indicating that, for its corresponding interested entity, the transmitted announcement message is a first announcement message received the interested entity for the PTMP service, transmitting uncompressed data packet headers to the interested entities; and
   responsive to each of the one or more interest messages indicating that, for its corresponding interested entity, the transmitted announcement message is not a first announcement message received by the interested entity for the PTMP service, compressing the header for the PTMP data packet service in the PTMP connection using a compressor state selected based on the state of de-compressors indicated by the received interest messages;
   wherein each compressor and de-compressor state refers to an amount of compression that a corresponding compressor or de-compressor is presently configured to use.

2. The method of claim 1, wherein the announcement message additionally comprises a polling message, for polling the number of interested receiving entities.

3. The method of claim 2, wherein the announcement message and the polling message are transmitted as separate messages.

4. The method of claim 2, wherein data packets comprising uncompressed data packet headers related to the announced data packet service are also transmitted if a message is received indicating that at least one of the interested entities has experienced a data packet header decompression error.

5. A non-transitory computer-readable medium storing a computer program product for header compression in a data packet in a point-to-multi point (PTMP) connection, said computer program product comprising computer program segments that when executed on a computer configures the computer to:
   transmit an announcement message announcing a PTMP data packet service;
   receive one or more interest messages indicative of a number of entities interested in the announced PTMP data packet service and the state of de-compressors of the interested entities, as a response to the transmitted announcement message;
   responsive to any of the one or more interest messages indicating that, for its corresponding interested entity, the transmitted announcement message is a first announcement message received by the interested entity for the PTMP service, transmit uncompressed data packet headers to the interested entities; and
   responsive to each of the one or more interest messages indicating that, for its corresponding interested entity, the transmitted announcement message is not a first announcement message received by the interested entity for the PTMP service, compress the header for the PTMP data packet service in the PTMP connection using a compressor state selected based on the state of de-compressors indicated by the received interest messages;
   wherein each compressor and de-compressor state refers to an amount of compression that a corresponding compressor or de-compressor is presently configured to use.

6. The non-transitory computer-readable medium storing the computer program product of claim 5, wherein the computer program product further comprises computer program segments for transmitting the announcement message as an announcement message for announcing the service and a polling message for polling the number of interested receiving entities.

7. The non-transitory computer-readable medium storing the computer program product of claim 6, wherein the announcement message and the polling message are transmitted as separate messages.

8. The non-transitory computer-readable medium storing the computer program product of claim 6, wherein the computer program product further comprises computer program segments for also transmitting data packets comprising uncompressed data packet headers related to the announced data packet service if a message is received indicating that at least one of the interested entities has experienced a data packet header decompression error.

9. A compressor for header compression of data packets in a point-to-multi point (PTMP) connection comprising one or more processing circuits configured to:
   transmit an announcement message announcing a PTMP data packet service;
   receive one or more interest messages indicative of a number of entities interested in the announced PTMP data packet service and the state of de-compressors of the interested entities, as a response to the transmitted announcement message;
   responsive to any of the one or more interest messages indicating that, for its corresponding interested entity, the transmitted announcement message is a first announcement message received by the interested entity for the PTMP service, transmitting uncompressed data packet headers to the interested entities; and
   responsive to each of the one or more interest messages indicating that, for its corresponding interested entity, the transmitted announcement message is not a first announcement message received by the interested entity for the PTMP service, compress the header for the PTMP data packet service in the PTMP connection, using a compressor state selected based on the state of de-compressors indicated by the received interest messages;

wherein each compressor and de-compressor state refers to an amount of compression that a corresponding compressor or de-compressor is presently configured to use.

10. The compressor of claim 9, wherein the announcement message comprises an announcement message for announcing the service and a polling message for polling the number of interested receiving entities.

11. The compressor of claim 10, wherein the compressor is configured to transmit the announcement message and the polling message as separate messages.

12. The compressor of claim 10, wherein the compressor is configured to transmit data packets comprising uncompressed data packet headers related to the announced data packet service if a message that at least one of the interested entities has experienced a data packet header decompression error is received.

13. A node for use in a wireless communication network, said node comprising:
- a communication interface for sending and receiving messages associated with point-to-multipoint data packet services provided by the wireless communication network; and
- a processing unit operatively associated with the communication interface, said processing unit comprising a compressor configured to compress data packet headers in data packets transmitted for the point-to-multipoint data packet services;

wherein said processing unit is configured to:
- send an announcement message to announce a particular point-to-multipoint data packet service and send a polling message to poll for the number of receiving entities interested in receiving the particular point-to-multipoint data packet service; and
- control data packet header compression by the compressor, for the point-to-multipoint data packet service, such that data packet header compression is not used, at least temporarily, if the node receives a first information message indicating that an interested receiving entity has received the polling message for the first time, or receives a second information message indicating that one of the interested receiving entities has experienced a data packet header decompression error; and
- resume compressing data packet headers for the particular data packet service, in response to receiving a subsequent status message from the interested receiving entity that sent the first or second information message.

14. The node of claim 13 wherein the node comprises one of: a base station transceiver, a gateway, or an access point.

* * * * *